United States Patent
Lin

(10) Patent No.: US 11,354,333 B2
(45) Date of Patent: Jun. 7, 2022

(54) METHOD AND SYSTEM FOR DATA EXPLORATION

(71) Applicant: SHENZHEN WITHSUM TECHNOLOGY LIMITED, Shenzhen (CN)

(72) Inventor: Yu Lin, Shenzhen (CN)

(73) Assignee: SHENZHEN WITHSUM TECHNOLOGY LIMITED, Shenzhen (CN)

( * ) Notice: Subject to any disclaimer, the term of this patent is extended or adjusted under 35 U.S.C. 154(b) by 277 days.

(21) Appl. No.: 16/672,439

(22) Filed: Nov. 2, 2019

(65) Prior Publication Data

US 2021/0019328 A1 Jan. 21, 2021

(30) Foreign Application Priority Data

Jul. 15, 2019 (CN) .......................... 201910636826.X

(51) Int. Cl.
*G06F 16/26* (2019.01)
*G06F 16/248* (2019.01)

(52) U.S. Cl.
CPC ............ *G06F 16/26* (2019.01); *G06F 16/248* (2019.01)

(58) Field of Classification Search
CPC .............................. G06F 16/26; G06F 16/248
USPC ........................................................ 707/722
See application file for complete search history.

(56) References Cited

U.S. PATENT DOCUMENTS

| 10,318,503 | B1 * | 6/2019 | Swamy | G06F 16/2428 |
| 2011/0020785 | A1 * | 1/2011 | Lowery, Jr | G16H 50/80 |
| | | | | 435/5 |
| 2013/0159310 | A1 * | 6/2013 | Birdwell | G06F 16/2453 |
| | | | | 707/737 |
| 2018/0165554 | A1 * | 6/2018 | Zhang | G06K 9/6256 |
| 2018/0268015 | A1 * | 9/2018 | Sugaberry | G06N 5/003 |

FOREIGN PATENT DOCUMENTS

| CN | 107766424 A | 3/2018 |
| CN | 107885965 A | 4/2018 |

* cited by examiner

*Primary Examiner* — Joshua Bullock

(57) ABSTRACT

The present application relates to a method and system for data exploration, the method comprising: selecting a specified research indicator from an indicator library according to input information; acquiring a data set, a research variable, and a research parameter corresponding to the research variable; matching available flows containing the research indicator and the research parameter from a flow library; selecting an exploration flow from the available flows according to an input instruction, and selecting an exploration data set from the data set; generating an output program code and an output program description of the exploration flow; executing the output program code of the exploration flow, exploring the exploration data set, and outputting an exploration result. In the solution of the present application, as long as a data set to be processed is submitted and the research indicator and the research parameter used in the exploration process are provided, a program code can be automatically output and called up to perform data exploration, thus greatly saving researcher's efforts in writing codes, and improving the data exploration efficiency.

20 Claims, 3 Drawing Sheets

METHOD AND SYSTEM FOR DATA EXPLORATION

RELATED APPLICATION

The present application claims the benefit of the Chinese patent application CN201910636826.X filed Jul. 15, 2019, which is incorporated herein by reference in its entirety.

FIELD OF THE INVENTION

The present application relates to the technical field of data processing, in particular to a method and system for data exploration.

BACKGROUND OF THE INVENTION

With the progress of modern science and technology and the rapid development and application of information technology, the informatization level of the entire industry is greatly improved. The data of the entire society are rapidly growing at an unprecedented speed, present the characteristics of large quantity, various varieties and fast updating, and gradually become one of the most important production factors in all walks of life. The high development and integration of cloud computing, Internet of things, mobile terminals and wearable devices enable the development trend to be faster and faster.

Correspondingly, the difficulty and complexity of data analysis are constantly increasing. Rich data contains massive valuable information, but such data need complex statistical analysis to extract meaningful results therefrom. The complex statistical analysis of data promotes the application of the statistics, especially the multivariate statistical analysis, for example, the methods of cluster and discriminant analysis, principal component analysis, factor analysis and the like have been widely used. Furthermore, the complex statistical analysis of data also brings the rapid development and application of artificial intelligence (AI) technologies such as machine learning and deep learning, for example, various deep learning network frameworks: unsupervised pre-training network, convolutional neural network, recurrent neural network, recursive neural network and the like. A large number of multivariate statistical methods and the neural networks consisting of large number of parameters and layers are used; therefore, the statistical methods become more and more complex and diversified, and the requirements for the combined use and mutual comparison of various statistical methods are constantly increasing.

Various relevant programs having a programming function, such as Python, JAVA, R, Matlab, SAS, SQL, C, Perl and the like, gradually become tools for scientific researches and daily statistical analysis; and more accurate computing methods are also widely used. New relevant programs having a programming function, such as Julia, the scientific computation oriented high performance dynamic language Julia and the like, emerge one after another. The tools are widely used in scientific research and production, such that scientific researchers and workers on a production line can get rid of manual computation, and can quickly find a process anomaly, thus promoting the improvement of scientific research and product quality. However, the wide use of the tools also needs the researches and workers to spend a lot of time and energy to learn and improve skills; therefore, the learning and application costs are greatly improved.

OBJECTS AND SUMMARY OF THE INVENTION

In order to overcome the problems in the related art at least to a certain extent, the present application provides a method and system for data exploration.

According to the first aspect of the embodiment of the present application, provided is a method for data exploration, comprising:

Selecting a specified research indicator from an indicator library according to input information;

Acquiring a data set, a research variable, and a research parameter corresponding to the research variable;

Matching available flows containing the research indicator and the research parameter from a flow library;

Selecting an exploration flow from the available flows according to an input instruction, and selecting an exploration data set from the data set;

Calling up a program code corresponding to the exploration flow, and generating an output program code and an output program description of the exploration flow;

Executing the output program code of the exploration flow, exploring the exploration data set, and outputting an exploration result.

Further, the generating an output program code and an output program description of the exploration flow comprises:

Calling up a method or an image in the exploration flow through the program code corresponding to the exploration flow, calling up a program code corresponding to the method and a program code corresponding to the image, and generating an output program code and an output program description.

Further, the method further comprises:

Selecting a specified research design from a design library according to the input information;

Further matching an available flow containing the corresponding research design from the available flows containing the research indicator and the research parameter.

Further, the method further comprises:

Selecting one or more exploration flows and data sets from the selected exploration flows and data sets according to the input instruction as a comparison flow and a comparison data set;

Calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

Executing the merged output program codes, and exploring the data set; and

Comparing the exploration result of the exploration flow with the exploration result of the comparison flow and outputting the comparison result.

Further, the comparing the exploration result of the exploration flow with the exploration result of the comparison flow and outputting the comparison result comprise:

Acquiring the exploration result of each research indicator of the exploration flow;

Acquiring the exploration result of each research indicator of the comparison flow;

Comparing the exploration result of the exploration flow of each research indicator with the exploration result of the comparison flow; and Displaying and outputting different exploration results in different formats.

Further, the acquiring a data set, a research variable, and a research parameter corresponding to the research variable comprises:

Acquiring a research variable and a data set inputted by a user;

Acquiring a variable in a variable library corresponding to the research variable specified by the user;

Acquiring parameter information corresponding to the research variable specified by the user or the variable in the variable library corresponding to the research variable specified by the user; and Determining the corresponding research parameter from a parameter library according to the parameter information.

Further, the research variable further comprises:

acquiring a variable in the variable library corresponding to the research variable specified by the user; enabling the variable to have an unique name, quickly renaming the variable for use in subsequent calling up and integration of a plurality of data sets, and the generation of the output program code and the comparison result.

According to the second aspect of the embodiment of the present application, provided is a system for data exploration, comprising:

a database, for storing a preset indicator library, a parameter library and a flow library, the indicator library storing a plurality of different research indicators, the parameter library storing a plurality of different research parameters, and the flow library storing a plurality of research flows, and program codes corresponding to the research flows;

An indicator selection module, for selecting a specified research indicator from the indicator library according to input information;

A data acquisition module, for acquiring a data set, a research variable, and a research parameter corresponding to the research variable;

A flow matching module, for matching available flows containing the research indicator and the research parameter from the flow library;

A flow selection module, for selecting an exploration flow from the available flows according to an input instruction, and selecting an exploration data set from the data set;

A program output module, for calling up a program code corresponding to the exploration flow, and generating an output program code and an output program description of the exploration flow; and An exploration output module, for executing the output program code of the exploration flow, exploring the exploration data set, and outputting an exploration result.

Further, the database is further used for storing a preset method library and an image library, the method library storing a plurality of different statistical methods; the image library storing a plurality of different images; the method library and the image library respectively storing program codes corresponding to each statistical method and each image.

Further, the database is further used for storing a preset variable library, the variable library storing a plurality of different research variables;

Correspondingly, the data acquisition module is further used for:

Acquiring a variable in the variable library corresponding to the research variable;

The database is further used for storing a preset design library, the design library storing a plurality of different research designs; correspondingly, the system further comprises:

A design selection module, for selecting a specified research design from the design library according to the input information;

The flow matching module is further used for:

Further matching an available flow containing the corresponding research design from the available flows containing the research indicator and the research parameter.

Further, the flow selection module is further used for:

Selecting one or more exploration flows and data sets from the selected exploration flows and data sets according to the input instruction as a comparison flow and a comparison data set;

The program output module is further used for:

Calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

The exploration output module is further used for:

Executing the merged output program codes, and exploring the data set; and

Comparing the exploration result of the exploration flow with the exploration result of the comparison flow and outputting the comparison result.

According to the third aspect of the embodiment of the present application, provided is a computing device, comprising a processor and a memory;

The memory is used for storing a computer program instruction;

When the computing device operates, the processor executes the computer program instruction in the memory, so as to execute the operating steps of any one method as described above.

The technical solution provided by the embodiment of the invention has the following beneficial effects:

In the solution of the present application, as long as a data set to be processed and a research variable are submitted and the research indicator and the research parameter used in the exploration process are provided, the required exploration flow can be automatically matched from a pre-constructed flow library, and a pre-stored program code can be called up to generate and process a data exploration program code. The solution can greatly save researcher's efforts in writing codes, thus improving the data exploration efficiency; furthermore, the exploration process is completely standardized and repeatable, thus facilitating the selection of a plurality of data sets and exploration methods for combination and result comparison.

It should be understood that the general descriptions above and the detailed descriptions hereafter are only intended for illustration and explanation, but not intended to limit the present application.

BRIEF DESCRIPTION OF FIGURES

The drawings herein are incorporated into the specification as a part of the specification, show the embodiments complying with the present application, and are used, together with the specification, to explain the principle of the present application.

DETAILED DESCRIPTION OF THE EMBODIMENT

The exemplary embodiments will be described in detail hereafter, and the examples thereof are denoted in the figures. When the figures are involved in the descriptions hereafter, unless otherwise stated, the same number in different figures denotes the same or similar element. The embodiments described in the following exemplary embodiments do not represent all the embodiments consistent with the present application. On the contrary, the embodiments are only the examples of the method and system consistent with a certain aspects of the present application as described in the claims.

In order to overcome the following problems in the related art at least to a certain extent: large data volume, fast updating, complex and diversified analysis methods, requirement for combined use, mutual comparison, diversified programming tools, high learning and application costs, one of the objects of the present invention is to realize: in the solution of the present application, as long as a data set to be processed and a research variable are submitted and the research indicator and the research parameter used in the exploration process are provided, the required exploration flow can be automatically matched from a pre-constructed flow library, and a pre-stored program code can be called up to generate and process a data exploration program code. (1) The solution can greatly reduce researcher's efforts in writing codes, can realize automatic or semi-automatic programming (a programmed program code can be submitted in the data acquisition part), thus improving the data exploration efficiency; (2) furthermore, the exploration process is completely standardized and repeatable; the methods and images used in the exploration process can be combined in a specific order, such that the exploration process can be accurately realized as required; (3) a plurality of data sets and exploration flows can be conveniently selected for combination and comparison to obtain a plurality of results and comparison results; and (4) the solution can simply realize the integration and standardization of a plurality of data sets, thus facilitating the utilization in subsequent exploration.

Figure 1:
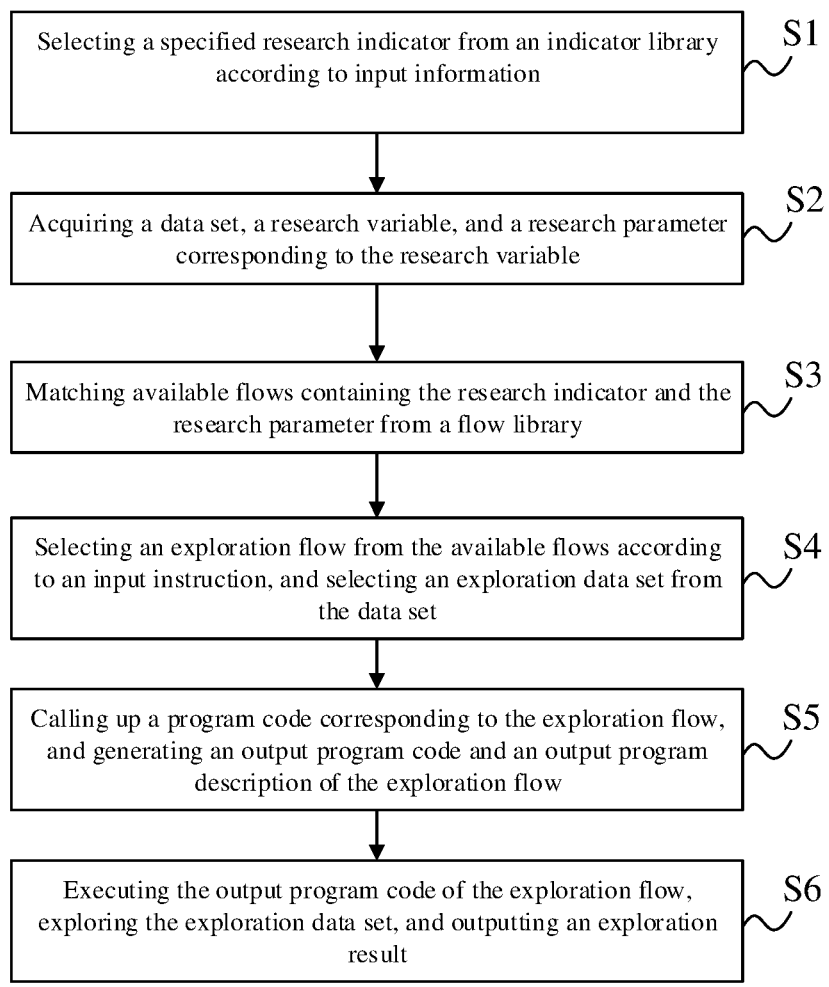
FIG. 1 is a flow chart of the method for data exploration according to one exemplary embodiment.

FIG. 1 is a flow chart of the method for data exploration according to one exemplary embodiment; the method comprises the following steps:

Step S1, selecting a specified research indicator from an indicator library according to input information;

Step S2, acquiring a data set, a research variable, and a research parameter corresponding to the research variable;

Step S3, matching available flows containing the research indicator and the research parameter from a flow library;

Step S4, selecting an exploration flow from the available flows according to an input instruction, and selecting an exploration data set from the data set;

Step S5, calling up a program code corresponding to the exploration flow, and generating an output program code and an output program description of the exploration flow;

Step S6, executing the output program code of the exploration flow, exploring the exploration data set, and outputting an exploration result.

In the solution of the present application, as long as a data set to be processed and a research variable are submitted and the research indicator and the research parameter used in the exploration process are provided, the required exploration flow can be automatically matched from a pre-constructed flow library, and a pre-stored program code can be called up to generate and process a data exploration program code. The solution can greatly save researcher's efforts in writing codes, thus improving the data exploration efficiency; furthermore, the exploration process is completely standardized and repeatable, thus facilitating the selection of a plurality of data sets and a plurality of exploration methods for combination.

In some embodiments, the generating an output program code and an output program description of the exploration flow comprises:

Calling up a method or an image in the exploration flow through the program code corresponding to the exploration flow, calling up a program code corresponding to the method and a program code corresponding to the image, and generating an output program code and an output program description.

Figure 2:
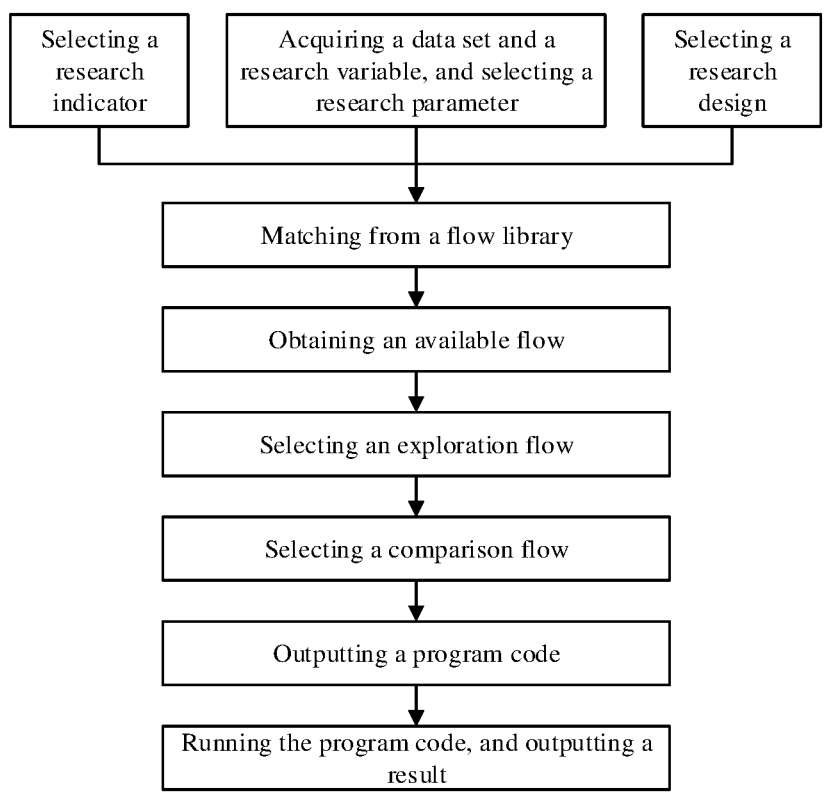
FIG. 2 is a flow chart of the method for data exploration according to another exemplary embodiment.

With reference to FIG. 2, in some embodiments, the method further comprises:

Selecting a specified research design from a design library according to the input information;

Further matching an available flow containing the corresponding research design from the available flows containing the research indicator and the research parameter.

In some embodiments, the method further comprises:

Selecting one or more exploration flows and data sets from the selected exploration flows and data sets according to the input instruction as a comparison flow and a comparison data set;

Calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

Executing the merged output program codes, and exploring the data set; and

Comparing the exploration result of the exploration flow with the exploration result of the comparison flow and outputting the comparison result.

In some embodiments, comparing the exploration result of the exploration flow with the exploration result of the comparison flow and outputting the comparison result comprise:

Acquiring the exploration result of each research indicator of the exploration flow;

Acquiring the exploration result of each research indicator of the comparison flow;

Comparing the exploration result of the exploration flow of each research indicator with the exploration result of the comparison flow; and Displaying and outputting different exploration results in different formats.

In some embodiments, acquiring a data set, a research variable, and a research parameter corresponding to the research variable comprises:

Acquiring a research variable and a data set inputted by a user;

Acquiring a variable in a variable library corresponding to the research variable specified by the user;

Acquiring parameter information corresponding to the research variable specified by the user or the variable in the variable library corresponding to the research variable specified by the user; and Determining the corresponding research parameter from a parameter library according to the parameter information.

In some embodiments, acquiring a data set, a research variable, and a research parameter corresponding to the research variable comprises:

Acquiring a variable in a variable library corresponding to the research variable specified by the user.

Therefore, the variable can have a unique name, and can be quickly renamed for use in subsequent calling up and integration of a plurality of data sets, and the generation of the output program code and the comparison result.

In order to further illuminate the solution of the present application, the details of each step of the method will be further described as follows.

1. Selecting a research indicator. Acquiring a pre-stored research indicator selected by a user, obtaining one or more research indicators, and marking as $r\_i$, $i=1, 2, \ldots$.

Further, the pre-stored research indicator and the pre-stored flows are in a one-to-more relationship, namely any one pre-stored research indicator can be stored in a plurality of pre-stored flows.

Further, the pre-stored research indicators are results obtained with the statistical methods comprising but not limited to mean, standard deviation, AIC, BIC, various regression model coefficients and P values, various comparison P values, area under curve, sensitivity, specificity and the like; the results obtained with the statistical methods are used to generate research results.

2. Selecting a research design. Acquiring a pre-stored research design selected by the user, obtaining one or more research designs, and marking as $e\_i$, $i=1, 2, \ldots$.

Further, the pre-stored research design and the pre-stored flows are in a one-to-more relationship, namely any one pre-stored research design can be stored in a plurality of pre-stored flows.

Further, the research design is a research design solution in statistics, comprises but not limited to completely random design, hierarchical classification design, split plot design, sequential experiment design and repeated measurement design, and is used to match the corresponding pre-stored flow.

3. Acquiring a data set and a research variable, and selecting a research parameter. Acquiring a data set and a research variable inputted by a user, and selecting a pre-stored research parameter corresponding to the research variable, (1) obtaining one or more data sets, and marking as $d\_i$, $i=1, 2, \ldots$; (2) obtaining one or more research variables in the one or more data sets, and marking as $v\_ij$, $i=1, 2, \ldots; j=1, 2, \ldots$; (3) obtaining one or more pre-stored parameters in the one or more data sets, and marking as $p\_ik$, $i=1, 2, \ldots; k=1, 2, \ldots$ (4) obtaining pre-stored variables corresponding to the research variables in the one or more data sets, and marking as $v2\_ij$, $i=1, 2, \ldots; j=1, 2, \ldots$.

Further, the pre-stored research variable comprises a unique name, an alias, a serial number, a type (a continuous value, a classification value, a grade value), and classification information for use in subsequent calling up and integration of a plurality of data sets and comparison results, such that the same variable in the one or more data sets has the unique name and can be quickly renamed, thus avoiding the situation that a program code cannot run due to irregular variable name.

Further, the pre-stored variables corresponding to a common research variable in a plurality of data sets can be merged via a program code to generate a new data set for use in subsequent exploration and comparison.

Further, the pre-stored parameters contain any combinations of the research variables, and are used to run subsequent flow program codes. Namely, the pre-stored parameters are the parameters required for running the flow program codes. The pre-stored parameters are further used to match the pre-stored flows containing the parameters.

Further, any one research variable can correspond to one pre-stored research variable, and is used to generate a data set containing the pre-stored research variable for use in subsequent analysis.

Further, any one pre-stored parameter may comprise one or more research variables.

Further, the pre-stored parameter and the pre-stored flows are in a one-to-more relationship, namely any one pre-stored parameter can be stored in a plurality of pre-stored flows.

Further, the data set can be inputted in the forms of a file, a database, or program codes.

Further, the program codes may comprise one or more programming languages, and can also be formed by combining one or more programming languages.

Further, the program codes can separately run, and can also run in a specific combination order.

4. Matching a pre-stored flow. After the research indicators and the parameters are selected, automatically matching the pre-stored flows containing the corresponding research indicators and the parameters, obtaining one or more pre-stored flows, and marking as $f\_i$, $i=1, 2, \ldots$.

Further, after the research designs are selected, further matching the pre-stored flows containing the corresponding research designs.

Further, the pre-stored flow comprises the information, node, path, method, image, parameter, indicator and program codes of the flow.

The information refers to the information pertaining to the description on the principles and combinations of statistical methods, image description, mathematical computing formula, threshold determination formula and the like, and is used for the output program description.

The node refers to the used statistical methods and images, and comprises: a method name for obtaining the research indicator result; or threshold determination; or an image name for displaying the research indicator result. The path refers to the path from one statistical method, image node or threshold determination node to the next statistical method, image node or threshold determination node. The program codes refer to the mathematical computing formula of the statistical method nodes, the image editor of the image nodes, the determination formula of the threshold determination node, and the program codes executed by a path, and are executed to obtain the output program code and the output program description.

The output program code and the output program description are used to determine whether or not the program codes are compiled and processed according to the output program description.

5. Selecting a pre-stored flow and a data set. Further, one or more matched pre-stored flows can be selected, and marked as $f2\_i$, $i=1, 2, \ldots$. The data set is one or more inputted data sets marked as $fd\_i$, $i=1, 2, \ldots$.

6. Selecting a comparison flow. Further, one or more pre-stored flows can be selected from the one or more selected pre-stored flows, and are marked as $c\_i$, i=1, 2, . . . .

7. Generating an output program code and an output program description, acquiring the operation, method, image and flow program code of the pre-stored flow, generating and saving the corresponding output program code and the output program description.

Further, the pre-stored flow comprises information, a node, a path, a method, an image, a parameter, a research indicator, a research design and a flow program code, wherein the node and the path form an operation; the method comprises the pre-stored method; the parameter comprises the pre-stored parameter; the research indicator comprises the pre-stored research indicator; the research design comprises the pre-stored research design; and the flow program code is used to execute the pre-stored flow.

Further, the pre-stored method comprises a statistical method and program codes of the method; the program codes of the method are used to execute the pre-stored method.

The pre-stored statistical method refers to the principle description of a statistical method (an article, a graph, a video or other forms acceptable for a person), a mathematical computing formula, and a statistic (research indicator), and is used for the output program description.

The method program code refers to the program codes of the mathematical computing formula for obtaining the research indicator, and is called up by the flow program code to generate an output program code; after the output program code is executed, a research indicator is obtained.

The pre-stored image refers to the principle description of various images for displaying the research indicators (an article, an graph, a video or other forms acceptable for a person), a mathematical computing formula, and a statistic (research indicator), and is used for the output program description.

The image program code refers to the program codes for completing image rendering to obtain an image, and is called up by the flow program code to generate an output program code; when the output program code is executed, an image is obtained.

The flow program code calls up the method program code or the image program code, generates an output program code, and obtains all the program codes for processing data, namely the output program codes.

Further, the program codes may comprise one or more programming languages, and can also be formed by combining one or more programming languages.

Further, the program codes can separately run, and can also run in a specific combination order.

Further, the generated output program description comprises the node information, path information, statistical method information, and image information of the pre-stored flow; namely, all the acquired operation information, statistical method information and image information for processing data can be displayed in the forms of words, image and the like, and are used to determine whether or not the output program codes are compiled according to the output program description.

Further, the flow research parameter is used to match with the pre-stored research parameter selected by the user.

Further, the flow research indicator is used to match with the pre-stored research indicator selected by the user.

Further, the flow research design is used to match with the pre-stored research design selected by the user.

8. Running the program codes, running the output program codes, obtaining and saving the corresponding running result.

9. Displaying the running result, displaying the pre-stored flow, the corresponding output program codes, the output program description and the corresponding running result.

Further, in the running result, each research indicator result is automatically compared with the research indicator results of the comparison flow; the research indicator results inconsistent with the research indicator results of the comparison flow are displayed in a different format, for example, in a different color, in a different font, or in the forms of words or image.

Further, if a plurality of comparison flows are referred, then one of the comparison flows is selected one by one in a specific order, so as to obtain the difference between the results of the research indicator of the selected comparison flow and other flows.

The solution of the present application will be further described hereafter in combination with specific application scenarios.

Scenario I: Data Prediction

1. Selecting a research indicator. When a prediction model for predicting data is constructed, the research indicators for evaluating the model are selected. For example, when a binary classification prediction model is established, the research indicators "AIC", "area under curve", "sensitivity", "specificity" and the like in the pre-stored research indicators are selected to evaluate the effect of the model.

2. Acquiring a data set and a research variable, and selecting a research parameter. Acquiring a data set and a research variable inputted by a user, and a pre-stored research parameter corresponding to the research variable. For example, the user inputs a data set, and hundreds of research variables, such as "whether a cancer occurs", "clinical feature", "iconography feature", "gene feature" and the like. The user corresponds the research variable "whether a cancer occurs" to the pre-stored research variable "binary classification dependent variable", and corresponds the other hundreds of research variables such as clinical feature", "iconography feature", "gene feature" and the like to the pre-stored parameter "independent variable".

3. Matching a pre-stored flow. After the research indicators and the research parameters are selected, matching a flow containing the corresponding research indicators and the research parameters from the pre-stored flows, obtaining one or more pre-stored flows. For example, the pre-stored flows "Logistic regression model", "LASSO Logistic regression model", "random forest model", "neural network model" and the like are matched according to the above-described research indicators "area under curve", "sensitivity", "specificity", the parameter "binary classification dependent variable" and the parameter "independent variable".

4. Selecting a pre-stored flow and a data set. The user selects one or more of the matched pre-stored flows, for example, the user selects the "Logistic regression model", and selects a data set to be used, for example, the data set inputted by the user.

5. Generating an output program code and an output program description, acquiring the operation, method, image and flow program code of the pre-stored flow, generating and saving the corresponding output program code and the output program description.

6. Running the program codes, running the output program codes, obtaining and saving the corresponding running result.

7. Displaying the running result, displaying the flow of the Logistic regression model, the corresponding output program codes, the output program description and the corresponding running result.

Scenario II: The Comparison of a Plurality of Data, a Plurality of Flows and a Plurality of Results (Also Applied to the Result Comparison of the Data after being Modified for Multiple Times)

1. Selecting a research indicator. When a prediction model for predicting data is constructed, the research indicators for evaluating the model are selected. For example, when a binary classification prediction model is established, the research indicators "AIC", "area under curve", "sensitivity", "specificity" and the like in the pre-stored research indicators are selected to evaluate the effect of the model.

2. Acquiring a data set and a research variable, and selecting a research parameter. Acquiring a data set and a research variable inputted by a user, and a pre-stored research parameter corresponding to the research variable. For example, the user inputs a data set, and hundreds of research variables, such as "whether a cancer occurs", "clinical feature", "iconography feature", "gene feature" and the like. The user corresponds the research variable "whether a cancer occurs" to the pre-stored research variable "binary classification dependent variable", and corresponds the other hundreds of research variables such as clinical feature", "iconography feature", "gene feature" and the like to the pre-stored parameter "independent variable".

Further, the data sets are selected according to different conditions, for example, a male and female data set, a male data set, a female data set; for another example, the data set provided for the first time, the data set provided for the second time, and the data set provided for the third time.

3. Matching a pre-stored flow. After the research indicators and the research parameters are selected, matching a flow containing the corresponding research indicators and the research parameters from the pre-stored flows, obtaining one or more pre-stored flows. For example, the pre-stored flows "Logistic regression model", "LASSO Logistic regression model", "random forest model", "neural network model" and the like are matched according to the above-described research indicators "area under curve", "sensitivity", "specificity", the research parameter "binary classification dependent variable" and the research parameter "independent variable".

4. Selecting a pre-stored flow and a data set. The user selects one or more of the matched pre-stored flows, for example, the user selects the "Logistic regression model", the "LASSO Logistic regression model", the "random forest model", and the "neural network model". The data set can be one or more of the male and female data set, the male data set, and the female data set.

5. Selecting a comparison flow. The user selects one or more of the selected pre-stored flows (containing the data set), for example, the user selects the "Logistic regression model" (the male data set) and the "random forest model" (the female data set) as comparison flows.

6. Generating an output program code and an output program description, acquiring the operation, method, image and flow program code of the pre-stored flow, generating and saving the corresponding output program code and the output program description.

7. Running the program codes, running the output program codes, obtaining and saving the corresponding running result.

8. Displaying the running result, displaying the flows of the "Logistic regression model" (the male and female data set), the "Logistic regression model" (the male data set", the "LASSO Logistic regression model" (the male data set), the "random forest model" (the female data set), and the "neural network model" (the male data set), the corresponding output program codes, the output program code description and the corresponding running result.

Further, the running result comprises a plurality of data, the research indicators of a plurality of flows; for example, by taking the "AIC", "area under curve", "sensitivity" and "specificity" of the first flow the Logistic research indicator (the male and female data set) as reference, the "AIC", "area under curve", "sensitivity" and "specificity" of the other flows, if consistent with the results of the first flow, are displayed in the same format, such as the same color or font, are displayed in a different format if inconsistent, and can also be displayed in the forms of words or image.

By taking the "AIC", "area under curve", "sensitivity" and "specificity" of the second flow the random forest regression model (the female data set) as reference, the "AIC", "area under curve", "sensitivity" and "specificity" of the other flows, if consistent with the results of the second flow, are displayed in the same format, such as the same color or font, are displayed in a different format if inconsistent, and can also be displayed in the forms of words or image.

Scenario III: Research Design Result Simulation

1. Selecting a research indicator. In the prediction model, the research indicators for evaluating the model are selected, for example, the type I error and power of the research design result under a specific condition. In this case, the research indicators "type I error" and "power" can be selected.

2. Selecting a research design. In the prediction model, the research designs for simulation are selected, for example, "comparison of two groups of means for simulating a normal distribution", "comparison of two groups of means for simulating a binomial distribution" and "comparison of two groups of means for simulating a sequential experiment" are selected.

3. Acquiring a data set and a research variable, and selecting a research parameter. Acquiring a data set and a research variable inputted by a user, and selecting a pre-stored research parameter corresponding to the research variable. For example, the user inputs a data set, and selects the research variables "mean 1", "mean 2", "standard deviation 1" and "standard deviation 2" from the data. Next, the user corresponds the research variables "mean 1", "standard deviation 1", "mean 2" and "standard deviation 2" to the pre-stored research parameters "mean 1", "standard deviation 1", "mean 2" and "standard deviation 2".

Further, the data can be read in the forms of a file, a database, or program codes.

3. Matching a pre-stored flow. After the research indicators, the research designs and the research parameters are selected, matching a pre-stored flow containing the research indicators from the pre-stored flows, the research designs and the research parameters, obtaining one or more pre-stored flows. For example, a plurality of pre-stored flows "comparison of two sample means for simulating a normal distribution" and "comparison of two sample means for simulating an exponential distribution" are matched according to the above-described research indicators "type I error" and "power", and the parameters "mean 1", "standard deviation 1", "mean 2" and "standard deviation 2".

4. Selecting a pre-stored flow and a data set. The user selects one or more of the pre-stored flows, for example, the "comparison of two sample means for simulating a normal distribution" and the inputted data set.

5. Selecting a comparison flow. The user selects the selected pre-stored flows (containing the data set).

6. Generating an output program code and a description, acquiring the operation, method, image and flow program code of the pre-stored flow, generating and saving the corresponding output program code and the output program description.

7. Running the output program codes, running the output program codes of the flow above, obtaining and saving the corresponding running result.

8. Displaying the running result, displaying the corresponding pre-stored flow, the output program codes, the output program description and the corresponding running results.

Figure 3:
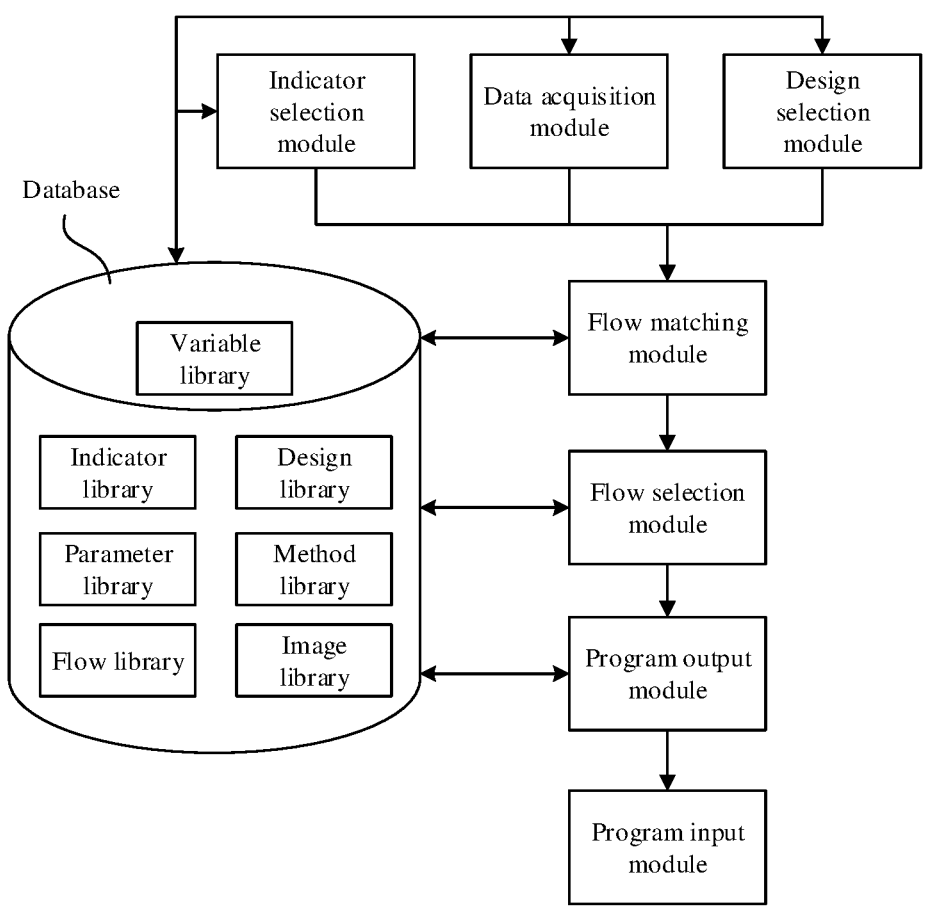
FIG. 3 is a structural block diagram of the system for data exploration according to one exemplary embodiment.

With reference to FIG. 3, the embodiments of the present application further provide a system for data exploration, comprising:

a database, for storing a preset indicator library, a parameter library and a flow library, the indicator library storing a plurality of different research indicators, the parameter library storing a plurality of different research parameters, and the flow library storing a plurality of research flows, and program codes corresponding to the research flows;

An indicator selection module, for selecting a specified research indicator from the indicator library according to input information;

A data acquisition module, for acquiring a data set, a research variable, and a research parameter corresponding to the research variable;

A flow matching module, for matching available flows containing the research indicator and the research parameter from the flow library;

A flow selection module, for selecting an exploration flow from the available flows according to an input instruction, and selecting an exploration data set from the data set;

A program output module, for calling up a program code corresponding to the exploration flow, and generating an output program code and an output program description of the exploration flow; and An exploration output module, for executing the output program code of the exploration flow, exploring the exploration data set, and outputting an exploration result.

Further, the database is further used for storing a preset method library and an image library, the method library storing a plurality of different statistical methods; the image library storing a plurality of different images; the method library and the image library respectively storing program codes corresponding to each statistical method and each image.

Further, the database is further used for storing a preset variable library, the variable library storing a plurality of different research variables;

Correspondingly, the data acquisition module is further used for:

Acquiring a variable in the variable library corresponding to the research variable;

The database is further used for storing a preset design library, the design library storing a plurality of different research designs; correspondingly, the system further comprises:

A design selection module, for selecting a specified research design from the design library according to the input information;

The flow matching module is further used for:

Further matching an available flow containing the corresponding research design from the available flows containing the research indicator and the research parameter.

Further, the flow selection module is further used for:

Selecting one or more exploration flows and data sets from the selected exploration flows and data sets according to the input instruction as a comparison flow and a comparison data set;

The program output module is further used for:

Calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

The exploration output module is further used for:

Executing the merged output program codes, and exploring the data set; and

Comparing the exploration result of the exploration flow with the exploration result of the comparison flow and outputting the comparison result.

With regard to the system in the above-described embodiment, the specific operation mode of each module thereof is already described in detail in the embodiment of the methods, and will not be repeated here.

The embodiment of the present application further provides a computing device, comprising a processor and a memory;

The memory is used for storing a computer program instruction;

When the computing device operates, the processor executes the computer program instruction in the memory, so as to execute the operating steps of any one method as described above.

According to the fourth aspect of the embodiment of the present application, provided is a computer readable storage medium storing a computer program for realizing, when executed by the processor, any one of the methods as described above.

It can be understood that the same or similar parts in the above-described embodiments can refer to each other; the content not described in detail in one embodiment can refer to the same or similar content in other embodiments.

It should be noted that in the description of the present application, the terms "first", "second" and the like are used for the purpose of description only, but not intended to indicate or imply relative importance. In addition, in the description of the present application, unless otherwise stated, "a plurality of" means at least two.

Any process or method described in the flow chart or described in other forms herein can be understood as a module, a segment or a part of the codes comprising an executable instruction for, when executed, executing one or more steps for realizing a specific logic function or process. Furthermore, the scope of the preferred embodiments of the present application comprises additional implements which may have an order different from the order shown or discussed herein, including the situation that a function is executed in a basically simultaneous mode or in a reverse order according to the involved function, which should be understood by a person skilled in the art of the embodiments of the present application.

It should be understood that various parts of the present invention can be realized by using hardware, software, firmware and a combination thereof. In the above-described embodiments, a plurality of steps or a method can be implemented via software or firmware stored in a memory and executed by an appropriate instruction execution system. For example, if implemented via hardware, the same as another embodiment, any one of the following commonly known techniques in the art or a combination thereof can be used to implement the above-described steps or method: a discrete logic circuit provided with a logic gate circuit for realizing the logic function of a data signal, a dedicated integrated circuit provided with an appropriately combined logic gate circuit, a programmable gate array (PGA), a field-programmable gate array (FPGA) and the like.

A person skilled in the art can understand that the whole or a part of the steps of the method for implementing the above-described embodiments can be completed by instructing relevant hardware via a program; the program can be stored in a computer readable storage medium; when the program is executed, one of the steps of the method embodiment or a combination thereof is executed.

In addition, the functional units in the embodiments of the present application can be integrated in one processing module, can also physically exist as independent units, and can also be pairwise or multi-wise integrated in one module. The integrated module can be implemented in the form of hardware, and can also be implemented in the form of a software functional module. If the integrated module is implemented in the form of a software functional module and is sold or used as an independent product, the integrated module can also be stored in a computer readable storage medium.

The storage medium mentioned above can be a read-only memory, a magnetic disk or a compact disk.

In the description of the specification, the reference terms "one embodiment", "some embodiments", "example", "a specific example" or "some examples" and the like mean that the specific characteristic, structure, material or feature described in combination with the embodiment or the example are contained in at least one embodiment or example of the present application. In the specification, the schematic recitation of the above-described terms does not necessarily refer to the same embodiment or example. Furthermore, the described specific characteristic, structure, material or feature can be combined in an appropriate manner in any one or more embodiments or examples.

Although the embodiments of the present application have been shown and described hereabove, it can be understood that the above-described embodiments are only for illumination, but not intended to limit the present application. And a person skilled in the art can make various changes, modifications, substitutions and variations to the above-described embodiments in the scope of the present application.

What is claimed is:

1. A method for data exploration using a system comprising a processor and a memory for storing and processing information, comprising the steps of:
   providing an input device for accepting data via a platform or interface;
   selecting a specified research indicator from an indicator library predefined by a user initially according to input information from a platform or interface, said research indicator being dependent on different statistical methods in use;
   acquiring a data set, a research variable, and a research parameter corresponding to the selected research variable by the user;
   matching available flows containing the research indicator and the research parameter from a flow library stored in the memory means;
   selecting an exploration flow from the available flows according to an input instruction, and selecting an exploration data set from the data set;
   calling up a program code corresponding to the exploration flow, and generating an output program code and an output program description of the exploration flow; and
   executing the output program code of the exploration flow, exploring the exploration data set, and outputting an exploration result, wherein:
   the research indicator is a pre-stored research indicator selected by the user;
   the platform allows the user intervention and can be operated using multiple programming language;
   the pre-stored research indicator is obtained with statistical methods; and
   the output program description is used to determine whether the output program code is generated according to the output program description.

2. The method in claim 1, wherein generating the output program code and the output program description of the exploration flow comprises:
   calling up a method or an image or a pre-stored coded segment constructed using a programming language in the exploration flow through the program code corresponding to the exploration flow, calling up a program code corresponding to the method and a program code corresponding to the image, and generating the output program code and the output program description.

3. The method in claim 2, wherein the acquiring a data set, a research variable, and a research parameter corresponding to the research variable comprises:
   acquiring a research variable and a data set inputted by the user;
   acquiring a variable in a variable library corresponding to the research variable specified by the user;
   acquiring parameter information corresponding to the research variable specified by the user or the variable in the variable library corresponding to the research variable specified by the user; and
   determining the corresponding research parameter from a parameter library according to the parameter information.

4. The method in claim 1, further comprising:
   selecting a specified research design from a design library stored in the memory means according to the input information; and
   further matching an available flow containing the corresponding research design from the available flows containing the research indicator and the research parameter.

5. The method in claim 4, wherein the acquiring a data set, a research variable, and a research parameter corresponding to the research variable comprises:
   acquiring a research variable and a data set inputted by the user;
   acquiring a variable in a variable library corresponding to the research variable specified by the user;
   acquiring parameter information corresponding to the research variable specified by the user or the variable in the variable library corresponding to the research variable specified by the user; and determining the corresponding research parameter from a parameter library according to the parameter information.

6. The method in claim 1, further comprising:

selecting one or more exploration flows and data sets from the selected exploration flows and data sets according to the input instruction as a comparison flow and a comparison data set;

calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

executing the merged output program codes, and exploring the data set; and comparing the exploration result of the exploration flow with the exploration result of the comparison flow and outputting the comparison result.

7. The method in claim 6, wherein the comparing the exploration result of the exploration flow with the exploration result of the comparison flow and outputting the comparison result comprise:

acquiring the exploration result of each research indicator of the exploration flow;

acquiring the exploration result of each research indicator of the comparison flow;

comparing the exploration result of the exploration flow of each research indicator with the exploration result of the comparison flow; and displaying and outputting different exploration results in different formats.

8. The method in claim 7, wherein the acquiring a data set, a research variable, and a research parameter corresponding to the research variable comprises:

acquiring a research variable and a data set from the input device via the platform or interface inputted by the user;

acquiring a variable in a variable library corresponding to the research variable specified by the user;

acquiring parameter information corresponding to the research variable specified by the user or the variable in the variable library corresponding to the research variable specified by the user; and determining the corresponding research parameter from a parameter library according to the parameter information.

9. The method in claim 6, wherein the acquiring a data set, a research variable, and a research parameter corresponding to the research variable comprises:

acquiring a research variable and a data set inputted by the user;

acquiring a variable in a variable library corresponding to the research variable specified by the user;

acquiring parameter information corresponding to the research variable specified by the user or the variable in the variable library corresponding to the research variable specified by the user; and determining the corresponding research parameter from a parameter library according to the parameter information.

10. The method in claim 1, wherein the acquiring a data set, a research variable, and a research parameter corresponding to the research variable comprises:

acquiring a research variable and a data set inputted by the user;

acquiring a variable in a variable library corresponding to the research variable specified by the user;

acquiring parameter information corresponding to the research variable specified by the user or the variable in the variable library corresponding to the research variable specified by the user; and determining the corresponding research parameter from a parameter library according to the parameter information.

11. A system for data exploration as claimed in the method of claim 1, comprising:

a processor comprising a memory means for storing a database, a parameter library and a flow library, the indicator library storing a plurality of different research indicators predefined by a user, the parameter library storing a plurality of different research parameters preset by the user, and the flow library storing a plurality of research flows defined by previous data exploration and selected parameters by the user, and program codes corresponding to the research flows, wherein:

the processor has a selection module comprising a selection indicator for selecting a specified research indicator from the indicator library according to input information from the user via an input device;

the processor has a data acquisition module for acquiring a data set, a research variable, and a research parameter corresponding to the research variable as defined by the user;

the processor has a flow module comprising a flow matcher, for matching available flows containing the research indicator and the research parameter from the flow library defined by previous data exploration and selected parameters by the user and a flow selector for selecting an exploration flow from the available flows according to an input instruction by the user, and selecting an exploration data set from the preset database;

the processor has a program output module and an exploration output module, the program output module is for calling up a program code corresponding to the selected exploration flow, and generating an output program code and an output program description of the selected exploration flow; and the exploration output module is for executing the output program code of the exploration flow, exploring the exploration data set; outputting an exploration result;

the research indicator is a pre-stored research indicator selected by the user;

the pre-stored research indicator is obtained with statistical methods; and the output program description is used to determine whether the output program code is generated according to the output program description.

12. The system in claim 11, further comprising a design selector for selecting a specified research design from the design library according to the input information, wherein:

the processor has the memory means for storing the database is further used for storing a preset variable library, the variable library storing a plurality of different research variables;

the data acquisition module is further used for acquiring a variable in the predefined variable library corresponding to the research variable selected by the user;

the processor has the memory means for storing the database is further used for storing a preset design library, the design library storing a plurality of different research designs; and the flow module is further used for further matching an available flow containing the corresponding research design from the available flows containing the research indicator and the research parameter.

13. The system in claim 12, wherein:

the flow selection module is further used for selecting one or more exploration flows and data sets from the selected exploration flows and data sets according to the input instruction as a comparison flow and a comparison data set;

the program output module is further used for: (a) calling up a program code corresponding to the comparison flow, and generating an output program code and an output program description of the comparison flow; and (b) respectively merging the output program code of the exploration flow and the output program code of the comparison flow, the output program description of the exploration flow and the output program description of the comparison flow, and generating the entire output program codes and output program descriptions; and the exploration output module is further used for: (a) executing the merged output program codes, and exploring the data set; and (b) comparing the exploration result of the exploration flow with the exploration result of the comparison flow and outputting the comparison result.

14. The system in claim 11, wherein:

the flow module having the flow selector is further used for selecting one or more exploration flows and data sets from the selected exploration flows and data sets according to the input instruction as a comparison flow and a comparison data set;

the program output module is further used for: (a) calling up a program code corresponding to the comparison flow, and generating an output program code and an output program description of the comparison flow; and (b) respectively merging the output program code of the exploration flow and the output program code of the comparison flow, the output program description of the exploration flow and the output program description of the comparison flow, and generating the entire output program codes and output program descriptions; and the exploration output module is further used for: (a) executing the merged output program codes, and exploring the data set; and (b) comparing the exploration result of the exploration flow with the exploration result of the comparison flow and outputting the comparison result.

15. A computing device, comprising a processor and a memory, wherein:

the memory is used for storing a computer program instruction; and when the computing device operates, the processor executes the computer program instruction in the memory, so as to execute the method in claim 1.

16. The computer device in claim 15, wherein the generating an output program code and an output program description of the exploration flow comprises:

calling up a method or an image in the exploration flow through the program code corresponding to the exploration flow, calling up a program code corresponding to the method and a program code corresponding to the image, and generating an output program code and an output program description.

17. The computer device in claim 15, wherein the method further comprises:

selecting a specified research design from a design library according to the input information; and further matching an available flow containing the corresponding research design from the available flows containing the research indicator and the research parameter.

18. The computer device in claim 15, wherein the method further comprises:

selecting one or more exploration flows and data sets from the selected exploration flows and data sets according to the input instruction as a comparison flow and a comparison data set;

calling up a program code corresponding to the comparison flow, and generating an output program code and an output program description of the comparison flow;

respectively merging the output program code of the exploration flow and the output program code of the comparison flow, the output program description of the exploration flow and the output program description of the comparison flow, and generating the entire output program codes and output program descriptions;

executing the merged output program codes, and exploring the data set; and comparing the exploration result of the exploration flow with the exploration result of the comparison flow and outputting the comparison result.

19. The computer device in claim 15, wherein the comparing the exploration result of the exploration flow with the exploration result of the comparison flow and outputting the comparison result comprise:

acquiring the exploration result of each research indicator of the exploration flow;

acquiring the exploration result of each research indicator of the comparison flow;

comparing the exploration result of the exploration flow of each research indicator with the exploration result of the comparison flow; and displaying and outputting different exploration results in different formats.

20. The computer device in claim 15, wherein the acquiring a data set, a research variable, and a research parameter corresponding to the research variable comprises:

acquiring a research variable and a data set inputted by the user;

acquiring a variable in a variable library corresponding to the research variable specified by the user;

acquiring parameter information corresponding to the research variable specified by the user or the variable in the variable library corresponding to the research variable specified by the user; and determining the corresponding research parameter from a parameter library according to the parameter information.

* * * * *